(12) United States Patent
Friedrich et al.

(10) Patent No.: US 8,966,011 B2
(45) Date of Patent: Feb. 24, 2015

(54) PERFORMANCE ENHANCING PROXY

(75) Inventors: Alisson Friedrich, Alanta, GA (US); John Yakemovic, Atlanta, GA (US); Thomas Steven Taylor, Atlanta, GA (US); Tom Hansen, Redmond, WA (US); Kiruthika Selvamani, Redmond, WA (US)

(73) Assignee: EchoStar Technologies L.L.C., Englewood, CO (US)

( * ) Notice: Subject to any disclaimer, the term of this patent is extended or adjusted under 35 U.S.C. 154(b) by 684 days.

(21) Appl. No.: 11/966,485

(22) Filed: Dec. 28, 2007

(65) Prior Publication Data

US 2009/0172801 A1    Jul. 2, 2009

(51) Int. Cl.
- G06F 15/16 (2006.01)
- H04L 29/08 (2006.01)
- H04L 29/12 (2006.01)
- H04L 29/06 (2006.01)

(52) U.S. Cl.
CPC ...... *H04L 67/2847* (2013.01); *H04L 29/12066* (2013.01); *H04L 61/1511* (2013.01); *H04L 67/14* (2013.01); *H04L 67/28* (2013.01); *H04L 69/14* (2013.01); *H04L 69/165* (2013.01)

USPC .......................................... 709/219; 709/203

(58) Field of Classification Search
USPC ................................................. 709/203, 219
See application file for complete search history.

(56) References Cited

U.S. PATENT DOCUMENTS

| | | | |
|---|---|---|---|
| 7,085,682 B1* | 8/2006 | Heller et al. | 702/186 |
| 2003/0069925 A1* | 4/2003 | Weaver et al. | 709/203 |
| 2003/0079022 A1* | 4/2003 | Toporek et al. | 709/227 |
| 2004/0010616 A1* | 1/2004 | McCanne | 709/238 |
| 2005/0089054 A1* | 4/2005 | Ciancaglini et al. | 370/412 |
| 2006/0212524 A1* | 9/2006 | Wu et al. | 709/206 |

* cited by examiner

*Primary Examiner* — Dustin Nguyen
*Assistant Examiner* — Joel Mesa
(74) *Attorney, Agent, or Firm* — Ingrassia Fisher & Lorenz, P.C.

(57) ABSTRACT

One embodiment of the present invention may take the form of a method and a system for performance enhancing proxy (PEP). A PEP system may include a configuration of software components and hardware devices to increase the performance of a two-way satellite broadband service. The PEP system may include one or more embodiments to reduce the time necessary for users to transmit and receive data provided through a communication network.

21 Claims, 10 Drawing Sheets

PERFORMANCE ENHANCING PROXY

FIELD

The present invention generally relates to satellite communications networks and, more particularly, a performance enhancing proxy for a communications network.

BACKGROUND

As more satellites are deployed into space, the field of satellite communications also expands into unknown frontiers. Once thought of as a telecommunication tool to only provide radio frequency transmissions from space to earth or vice versa, satellite communications networks have now expanded into the areas of weather forecasting, cable television, mobile technologies, TV and radio broadcasting, global positioning systems, Internet, communications, and so forth. As this market continues to flourish and more users gain access, users' demand for quality service will also increase. In other words, users connecting their devices to satellite communications networks will desire and expect to retrieve and send data at faster speeds. In response to those demands, satellite communications network suppliers will need to provide a satellite communications service capable of transmitting and receiving data within periods of time that are equal to or less than current time periods associated with data transmissions of a land communications network service.

SUMMARY

The present invention relates to a communications network system. More specifically, one embodiment of the communications network system may take the form of a performance enhancing proxy (PEP) system and method for operating a PEP system. An exemplary PEP system may include a configuration of software components and/or hardware devices designed to facilitate the performance of a two-way broadband service.

The PEP system may provide user services, such as Internet access services, virtual private network (VPN) services, and so forth. The Internet access service may incorporate a service offered by an Internet Service Provider (ISP) to a user's device. It may allow a user's device to attach to a proxy terminal to access the Internet via a communications network, such as a satellite communications network. The VPN service may include a service offered by a network service provider to a company. It may allow a satellite communications network to interconnect with the company's land area network (LAN) as if it was part of the same private network. A company may have several scattered, but interconnected LANs where certain LANs has satellite access and other LANs have terrestrial access.

The PEP system may reduce the time necessary for users to request and retrieve data (e.g. website information) provided through a satellite communications network. Each embodiment of the present invention may be employed in combination with other PEP strategies/systems discussed herein or provided elsewhere, or as a single implementation. The following paragraphs provide a brief discussion on various embodiments of the PEP system.

The PEP system may facilitate a method of communicating across a communications network between a client proxy and a hub proxy. The communications network may comprise a satellite communications network and/or a land network. The client proxy may include an intermediary program, terminal, and/or device, which acts as a client and/or server for the purpose of making requests on behalf on a client across the communications network to the hub proxy. A client may include a user's device that establishes connections with the client proxy for the purpose of sending requests and receiving responses to those requests. A hub proxy may include a program, a device, an earth terminal or station that transmits and/or receives signals from the client proxy and may act as an intermediary on behalf of the client proxy when interacting with one or more servers, such as an Internet server, a VPN server and so forth.

The embodiment may establish a plurality of unidirectional persistent connections between the client proxy and the hub proxy device across the communications network. A first connection of the plurality of unidirectional persistent connections may be designated as a forward transmission link to transmit message signals from the client proxy to the hub proxy. Similarly, a second connection of the plurality of unidirectional persistent connections may be designated as a response transmission link to transmit message signals from the hub proxy to the client proxy.

The client proxy may receive, from the client, a first request for data associated with an application program, a browser, and/or a specific website. In response, the embodiment may facilitate transmitting the first request to the hub proxy across the forward transmission link. After receiving the request, the hub proxy may interact with one or more servers to retrieve a response message to the client proxy's request and, after obtaining a response message, transmit the response message across the response transmission link to the client proxy. The client proxy, in response to receiving the response message, may forward the request message to the client. In one aspect of the embodiment, each persistent connection is maintained over a period of time, until the hub proxy and/or the client proxy is offline and inoperative.

Another embodiment of the PEP system may employ a method of obtaining a domain name and/or Internet Protocol (IP) address list of the most requested IP addresses. The embodiment may facilitate a hub proxy receiving a plurality of domain name requests for a plurality of websites from at least one client proxy. In particular, the hub proxy may receive one or more domain name requests from a plurality of client proxies. In response to receiving each request, the hub proxy may submit requests for IP addresses associated with each domain name request to one or more domain name system (DNS) servers. The hub proxy may receive the IP addresses associated with each domain name request and, over a period of time, generate a list of the most requested domain names and/or IP addresses. After the period expires, the hub proxy may transmit the list of the most frequently requested the domain names and/or addresses to each client proxy or specific client proxies associated with the PEP system.

In still another embodiment, the PEP system may employ a method of prefetching data based on data retrieved in response to a client proxy's request. The embodiment may establish a connection between the client proxy and the hub proxy across a communication network. Afterwards, the embodiment may facilitate receiving a first request for data (e.g. webpage data) from the client proxy to the hub proxy. The hub proxy may transmit the first request to a server and then, receive a response to the first request. Afterwards, the hub proxy may determine whether the response identifies additional data that later may be requested. If the embodiment determines that additional data may possibly be requested later, the embodiment may prefetch the additional data and, in response, transmit that data to the client proxy.

As will be realized by those of ordinary skill in the art upon reading the entirety of this disclosure, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

The drawings described herein are for illustration purposes only and are not intended to limit the scope of the present disclosure in any way.

DETAILED DESCRIPTION

Figure 1:
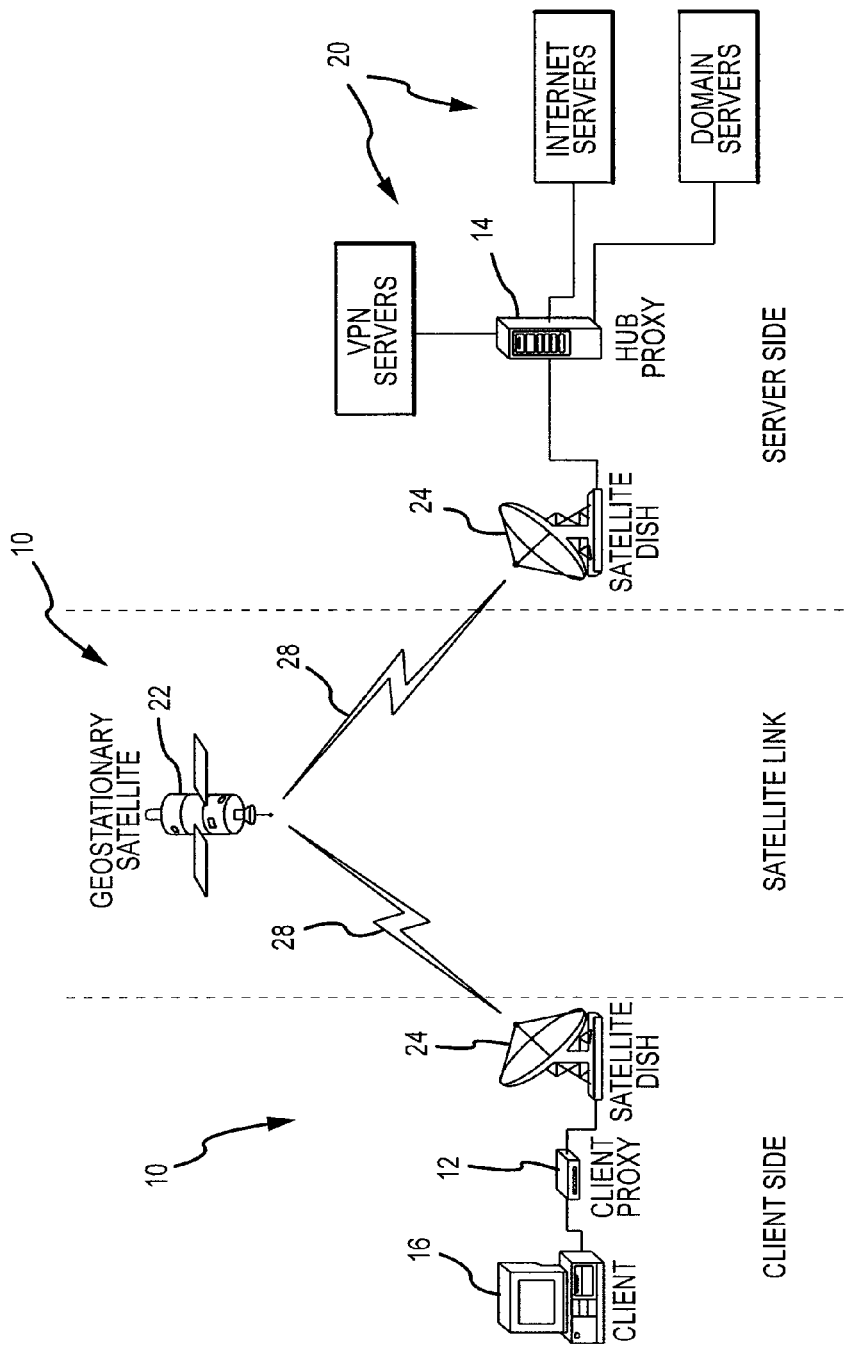
FIG. 1 is an exemplary environmental view of a performance enhancing proxy (PEP) system according to the present disclosure.

An embodiment of the present invention may take the form of a performance enhancing proxy (PEP) system and method for operating a PEP system. An exemplary PEP system may include a configuration of software components and/or hardware devices designed to facilitate the performance of a two-way satellite broadband service.

In one embodiment, the PEP system may include a client proxy, a hub proxy in communication with the client proxy across a communications network. In general, the client proxy and/or the hub proxy may communicate with other devices, systems, and/or programs to facilitate their interactions between one another. In particular, the client proxy may also communicate with a client, and the hub proxy may communicate with one or more servers, such as one or more virtual private network (VPN) servers and/or one or more Internet servers. In order to aid the reader to better understand the present disclosure, the following paragraph generally defines the terms of the PEP system.

The client proxy may embody an intermediary program, terminal, and/or device, which acts as on behalf of the client for the purpose of intermitting requests from a client side of the communications network. The client may comprise a user's device that establishes connections for the purpose of sending requests and receiving responses to those requests. For example, the client may include a computing device, a multi-media device, a mobile telecommunications device, and so forth. The client's interaction with the client proxy may be transparent to the client.

The hub proxy may entail a program, a device, and/or an earth terminal or station that transmits and/or receives signals from a client proxy and acts as an intermediary on behalf of the client proxy when communicating with one or more servers. The hub proxy may access the Internet and/or one or more VPN networks using a data transmission protocol such as TCP/IP networking protocol and Hyper Text Transfer Protocol (HTTP). The hub proxy may receive requests as if it were the origin server for the requested resource. Likewise, the hub proxy may transmit requests to the client proxy as if it were the origin server for the response resource. Additionally, the interaction between the client proxy and the hub proxy may be transparent to the client.

The communications network may incorporate a land communications network, and/or, preferably, a satellite communications network. The satellite communications network may employ one or more satellite towers and/or satellites that operate as an intermediary gateway between the client proxy and the hub proxy. The communication network may include a client side and a hub side. The client side is indicative of a side of the communication network that receives and/or transmits data to the client and/or client proxy. The hub side is indicative a side of the communication network that receives and/or transmits data to the hub proxy.

The client proxy and the hub proxy may be located in two separate geographical locations. The client proxy may be a bi-directionally linked to the hub proxy by the satellite communications network. More specifically, the client proxy and the hub proxy may establish and maintain multiple unidirectional persistent Transmission Control Protocol/Internet Protocol (TCP/IP) connections for all communications between each other. This may avoid the delay imposed by waiting for a TCP/IP connection to be established for every request sent by the client or messages sent by the hub proxy. In other words, the client proxy and the hub proxy may establish several persistent connections, such that each persistent connection handles multiple client requests over the same connections without disconnecting the client proxy from the hub proxy.

In another embodiment, the PEP system may include a client proxy and a hub proxy, as described above. In this embodiment, the client proxy and the hub proxy may establish a connection for communication. This connection may comprise a TCP connection. More specifically, this connection may include one or more TCP persistent connections. The client may transmit a DNS server request for an Internet protocol (IP) address associated with a specific web page. Once the request is received, the client proxy may transmit, to the client, an internally generated IP address (referred to herein as an "IP spoof address") and transmit an originally received request for the IP address to the hub proxy across the communications network. The client may receive the IP spoof address and, in response, transmit a request for information related to the web page associated with the IP spoof address. The client proxy may intercept this request and exchange the IP spoof address for the originally requested web page name before transmitting this request to the hub proxy. The hub proxy may receive the original DNS request from the client proxy and transmit that request to a DNS server. In response, the hub proxy may receive an IP address and interact with an Internet server identified by the IP address to request information from the specific web page associated with the IP address. The hub proxy may receive a data response message from the Internet server and transmit it to the client proxy across the established connection. In turn, the client proxy may transmit the data response message to the client.

In still another embodiment, the PEP system may include one or more client proxies and a hub proxy, as described above. This embodiment may create a static DNS list containing the most requested IP addresses. The hub proxy may monitor clients' DNS requests and/or requests for data from IP addresses. In doing so, the hub proxy may use a statistical algorithm to determine the most requested IP addresses over a period of time, and generate the list. Once the time period expires, the hub proxy may transmit the list to the client proxies across a communication network. When a client requests an IP address for a specific domain name in the DNS list, its respective client proxy may immediately transmit the IP address to the client.

In yet another embodiment, the PEP system may include a client proxy and a hub proxy, as described above. In this embodiment, the hub proxy receives a request packet from the client proxy and interacts with an Internet server to retrieve a response to the request packet. After analyzing the response, the hub proxy determines whether to prefetch additional data that the client may request in the future. Such data may be identified in the response generated by the Internet server. For example, the hub proxy may examine the response to determine if the response may require the client to request other data associated with and/or to complete the response. Continuing the example, if the response includes text data and indicator links for graphics, audio, and/or video media, etc., the hub proxy may request that graphic and/or audio or video media data from the Internet server. Once the prefetched data is received, the hub proxy may transmit the prefetched data to the client proxy preemptively. In this manner, when the client requests data included among the prefetched data, the client proxy may transmit the request data and thereby, reduce the time it takes for the client to receive the data.

The following paragraphs further discuss each of the embodiments disclosed above.

Exemplary Operating Environment

Figure 2:
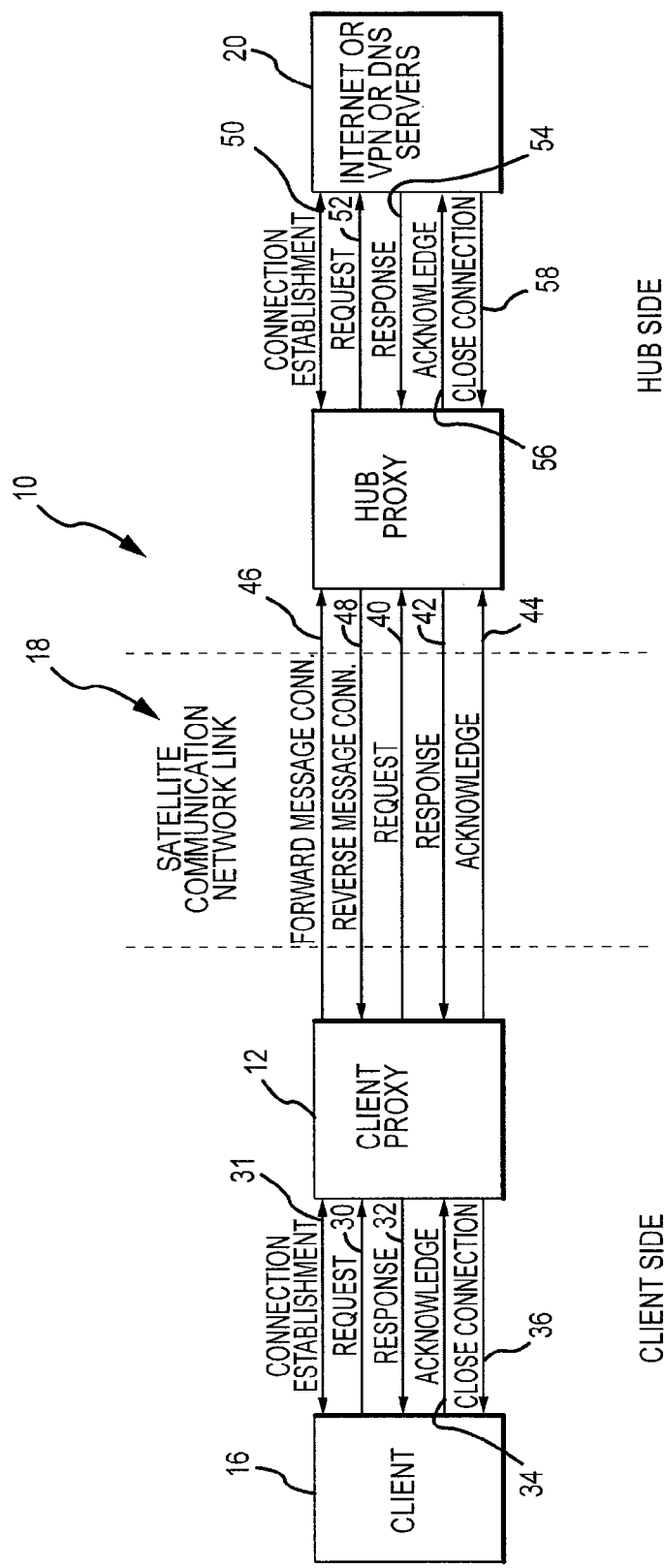
FIG. 2 is an exemplary block diagram of one embodiment of the PEP system according to the present disclosure.

FIG. 1 is an exemplary environmental view of a PEP system. FIG. 2 is an exemplary block diagram of the PEP system. The PEP system of FIG. 2 may be used in a variety of operating environments including the exemplary environment shown in FIG. 1.

Referring to FIG. 1, a PEP system 10 may include a client proxy 12 and a hub proxy 14 as described above. In general, a client 16 may communicate with the client proxy 14, and the client proxy 14 may communicate with the hub proxy 14 via a satellite communications network 18. The hub proxy 14 may communicate with one or more servers 20. More specifically, the client proxy 12 may transmit and receive radio frequency signals from the hub proxy 14 via a geo-synchronous satellite 22. The hub proxy may multiplex the data streams from the client proxy onto another network (e.g., Internet or VPN) linked at that the hub proxy and, in response, communicate the received responses to the client proxy.

The satellite communications network 18 may encompass a plurality of terrestrial satellite dishes or ground stations 24 and the satellite 22. Each satellite dish or ground station 24 may incorporate a transceiver and antenna for transmitting and/or receiving data while in communication with the satellite 22 and the client proxy 12. Some satellite dishes 24, located on a client side of the communications network 18, may communicate with one or more client proxies 12 (e.g., satellite modems) that each communicates with one or more clients 16 (e.g., computing devices). Other satellite dishes 24, located on a hub side of the communications network 18, may communicate with the hub proxy 14.

At least one satellite communications link 28 may be associated with the satellite communications network 18 and may include several telecommunication links, such as an uplink, a downlink, a forward link, and a return link (commonly called a reverse link). The uplink may occupy a portion of the satellite link 28 used for the transmission of signals from the client proxy 12 or the hub proxy 28 to the satellite 22. The downlink may be defined as a portion of the satellite link 28 from the satellite 22 to the hub proxy 14 or the client proxy 12. It is the inverse of the uplink. The forward link may possess a portion of the satellite link 28 from the client proxy 12 to the hub proxy 14. In other words, the forward link may consist of both an uplink (from the client proxy to a satellite) and a downlink (from the satellite to the hub proxy). The response link may comprise a portion of the satellite link from the hub proxy to the client proxy. Similar to the forward link, the response link may include both an uplink (from the hub proxy to the satellite) and a downlink (from the satellite to the client proxy).

Using the above-mentioned data transmission protocols and transmission links, it may take a typical client proxy and hub proxy approximately 500 milliseconds to establish a connection before any data transfer occurs. Thereafter, it may take the client proxy about another 500 millisecond or more to retrieve the requested data. After the client proxy receives the requested data, the connection may be closed and a new connection must be established to transmit another data request. The following paragraphs disclose certain methods and systems that facilitate reducing the amount of time it takes a client to receive the requested data across a communications network.

Persistent Connections

Again referring to FIGS. 1 and 2, the client 16 may include a conventional computing device that accesses a remote service on another computer by a network. In one embodiment, the client 16 may connect, directly or indirectly, to one or more servers 20 to request some data, such as a file, a VPN, e-mail, a web page, one or more data files from the web page or other resource available.

In order to do so, the client 16 may transmit a request 30 to establish a connection 31 with the client proxy 12. The connection 31 may include a persistent or non-persistent connection to facilitate a connection set up, the client 16 and the client proxy 14 may negotiate connection parameters and initialize state information, such as a sequence number, flow control variable, and buffer allocations. In response to the request, the client 16 may receive a message accepting the request from the client proxy 12 and transmit an acknowledgement message to the client proxy 12 to complete the connection. After such time, the client 16 may send a data request packet to the client proxy 14 and likewise, receive a data response packet from the client proxy 14. If a nonpersistent connection is used, the client may receive or receive a close connection message after each request-response interaction. Otherwise, if a persistent connection is used, the connection may remain active for a period of time or until either the client or client proxy is offline or inoperative.

Each data packet may include a header and one or more messages. The header may include a source address, a destination address, and a port number. The source address may include an address of the client. The destination address may include an address of a server to which a message is designated. The port number is an address that identifies which process or program is to receive a message that is delivered to the client.

Still Referring to FIGS. 1 and 2, the client proxy 12 may include any conventional proxy (e.g. a modem, router, gateway, server etc.) that services requests on behalf of the client 16 by forwarding requests and receiving responses from one or more servers 20. In one embodiment, the client proxy may alter messages received from the client to transmit on behalf of the client and messages designated to be transmitted to the client, which were sent by the hub proxy.

In one embodiment, the client proxy 12 may generate a unique identification (ID) for each message sent through the persistent connection in order to distinguish messages sent through the persistent connections. The ID may include at least one of a uniform resource locator (URL) address, port number, and source IP address of the client proxy. In one embodiment, the ID may include only the URL address. This unique ID may be added to the header of the data request packet. Using the ID, the client proxy 12 may also associate the response data packet sent by the hub proxy 14 with its original request data packet sent to the hub proxy 14, since both the response and the request may typically have the same ID. After receiving the response data packet, the client proxy 12 may extract the unique ID from the header and transmit the response to the client 16.

The following paragraphs discuss the interaction of the client proxy with the hub proxy.

When the request packet is received, the client proxy 12 may connect to a specific server, such as the hub proxy 14 via the satellite link 28 and request a service on behalf of the client 16. In one embodiment, the client proxy 12 may establish a connection with the hub proxy 14 to request and receive messages. This set up is a three-set process between the client proxy 12 and the hub proxy 14. First, the client proxy makes a connection setup request, such as a TCP connection request. Second, the hub proxy accepts the connection request. Third, the client proxy transmits an acknowledgment message to the hub proxy. The TCP connection is now ready. At this time, the client proxy may transmit a request message for data to the hub proxy on behalf of the client.

More specifically, the connection between the client proxy 12 and the hub proxy 14 may include a persistent connection via the satellite link 2, such that the persistent connection remains open to allow the client proxy 12 to transmit several requests over a single connection and avoid the inefficiency and delay of opening and closing connections to send requests.

The persistent connection may include a unidirectional persistent connection for communication between the client proxy 12 and the hub proxy 14. More specifically, the client proxy 12 and the hub proxy 14 may establish a plurality of multiple unidirectional persistent connections. For example, forward link messages may be routed through the persistent connections designated as forward message links 46 in a fashion to equally distribute their use. Likewise, return link messages may be routed through the persistent connections designated as return message links 48 in a fashion to equally distribute their use. The forward link 46 may include a portion of the satellite link 28 used to carry messages from the hub proxy 14 to the client proxy 12. The return link 48 may include a portion of the satellite link 28 used to carry messages from the client proxy 12 to the hub proxy 14. In one embodiment, each persistent connection may only be disconnected when the client proxy or the hub proxy loses power, is offline, or is inoperable for a predetermine period of time. Alternatively, each persistent connection may be terminated after a predetermined time period expires.

Referring again to FIG. 1, the satellite communications network 18 may include a conventional two-way geo-synchronous satellite 22. Each of the client proxy 12 and the hub proxy 14 may communicate with one another via the satellite communications network 18. The satellite communications network 18 may provide a bi-directional link between the client proxy 12 and the hub proxy 14. In other words, the satellite communications network may be used as a broadband communication link through which the client proxy and the hub proxy may transmit and receive messages to and from one another. Generally, the satellite communications network may transmit a message from one entity to another in about 250 milliseconds.

The following paragraphs discuss the hub proxy's interaction with one or more Internet servers.

The hub proxy 14 may establish a connection 50, using a connection protocol (e.g. TCP/IP protocol), with the server 20. The server 20 may include, for example, an Internet server and/or a VPN server. In establishing the connection 50, the hub proxy 14 may transmit a connection request 52 and receive a response message 54 to accept the connection 50 from the server 20. In response, the hub proxy 14 may transmit an acknowledgment message 56 to the server 20. This may complete process for establishing the connection between the client proxy and a connecting server. Once the connection is established, the hub proxy may forward a data request and receive a data response via the connection. After receiving the data response, the hub proxy and the server may terminate the connection by sending a termination message 58.

In one embodiment, the hub proxy 14 may request a persistent connection with the server 20, such that the server may keep the connection open for a period of time after sending the data response.

Figure 3:
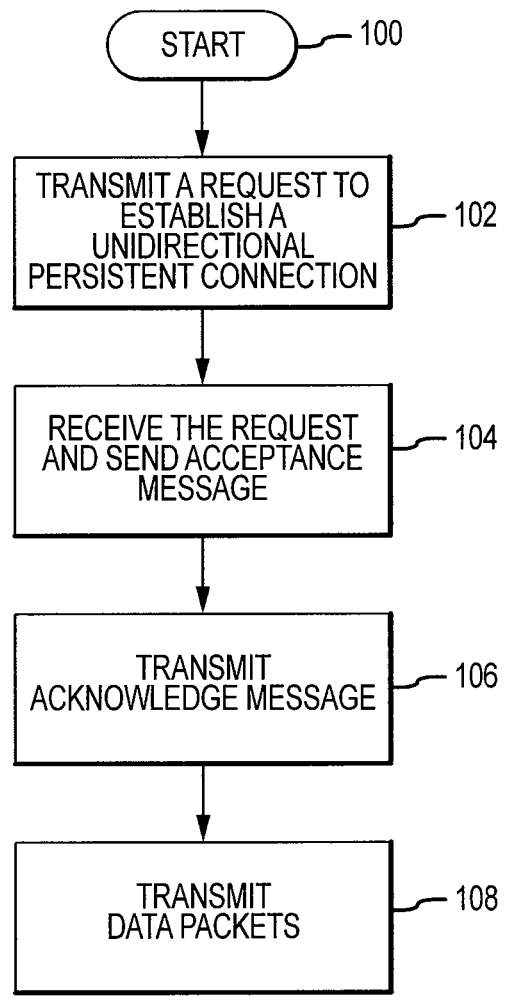
FIG. 3 is an exemplary flow chart of an exemplary operation of the PEP system of FIG. 2.

FIG. 3 depicts a first exemplary method or operation of transmitting data using the satellite communications network 18 for an embodiment of the PEP system 10 discussed herein starting at operation 100. In operation 102, the client proxy 12 transmits a request to establish at least one of a plurality of unidirectional persistent connections with the hub proxy 14. The at least one of the plurality of persistent connections is designated for use as a return link; otherwise, it is designated for use a forward link. The hub proxy 14 receives the request and sends an acceptance message to the client proxy in operation 104. In response to operation 104, the client proxy 12 transmits an acknowledgement message in operation 106 and thus, establishing the persistent connection. The client proxy 12 and/or the hub proxy 14 maintains this connection unless a power loss or in operative state exists for either device. In operation 108, the client proxy begins transmitting data packets to the hub proxy using this connection. The client proxy may continue to transmit request to establish the plurality of persistent connections with the hub proxy. Additionally, the hub proxy may transmit a plurality of requests to establish a plurality of connections with the client proxy or another client proxy.

Figure 4:
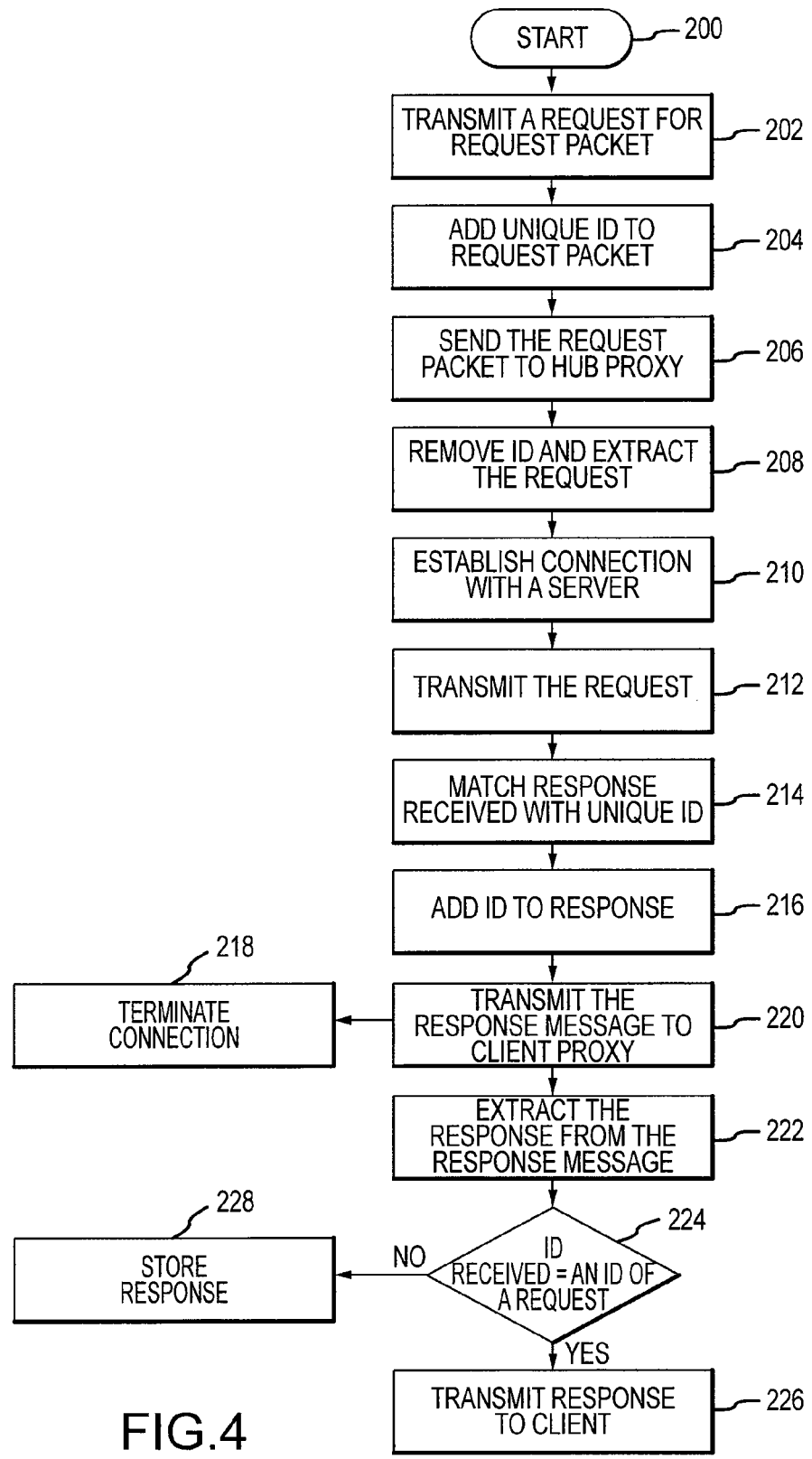
FIG. 4 is an exemplary flow chart of another exemplary operation of the PEP system of FIG. 2.

FIG. 4 illustrates a second exemplary method or operation of transmitting data using the satellite communications network 18 for an embodiment of the PEP system 10. In this operation, the plurality of persistent connections have been established between the client proxy 12 and hub proxy 14 in order to allow an exchange of messages on behalf of the client 16. For example, the client proxy 12 may transmit messages across the first or forward persistent connection to the hub proxy and receive messages on the second or response persistent connection from the hub proxy.

Referring to FIG. 4, the operation starts in operation 200. In operation 202, the client 16 transmits a request for request packet associated with a URL address to the client proxy 12. The client proxy 12 receives the request packet and adds a unique ID to the request packet in operation 204. In operation 206, the client proxy 12 then sends the request packet to the hub proxy 14 using the return persistent connection. The hub proxy receives the packet, removes the ID, and extracts the request in operation 208. It then establishes the connection with the Internet server 20 in operation 210. This connection may be a TCP/IP protocol, a UDP protocol, or any suitable connection.

After establishing the connection in operation 210, the embodiment executes operation 212. In operation 212, the hub proxy 14 transmits the request packet to the server 20. When the response comes back to the hub proxy 14, the hub proxy 14 matches it against the unique ID of the original request in operation 214 and, in operation 216, adds the ID to the response packet. In operation 218, the hub proxy 14 and the server 20 may terminate the connection after the server 20 transmits the response and executes operation 220. In operation 220, the hub proxy then sends the response packet back to the client proxy via a forward persistent connection.

The client proxy 12 receives the response and executes operation 222. In operation 222, the client proxy 12 extracts the response from the response packet. The client proxy 12 also determines whether the response packet received is associated with the request sent to the hub proxy 14. In doing so, the client proxy 14 compares the associated ID received with the response packet to the unique ID of the request packet in operation 224. If the IDs of a request and a response match, operation 226 is executes. In operation 226, the client proxy 12 transmits the response to the client. If not, operation 230 executes. In operation 230, the client proxy stores the response in a related data store. After the completion of the response transfer to the client, the client and the client proxy terminate the connection between them in operation 232.

DNS Enhancement with IP Spoofing

Figure 5:
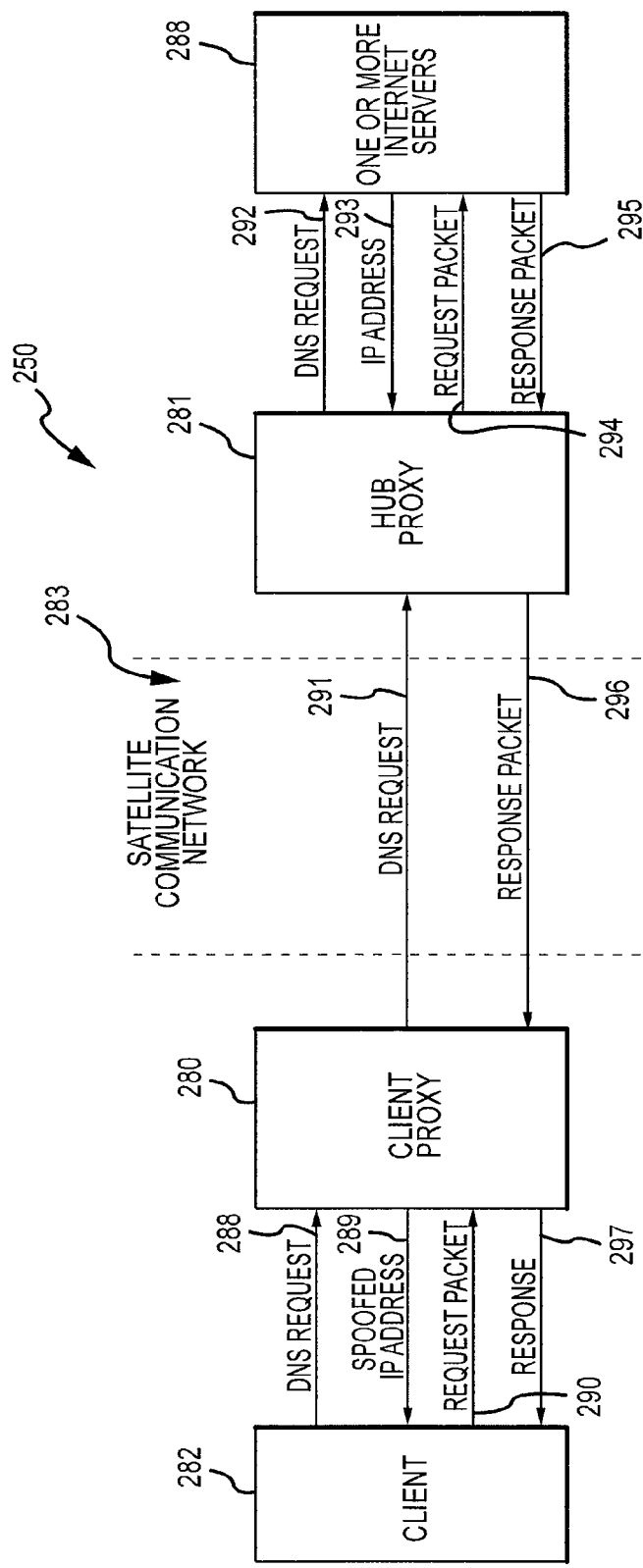
FIG. 5 is an exemplary block diagram of an embodiment of the PEP system according to the present disclosure.
Figure 6:
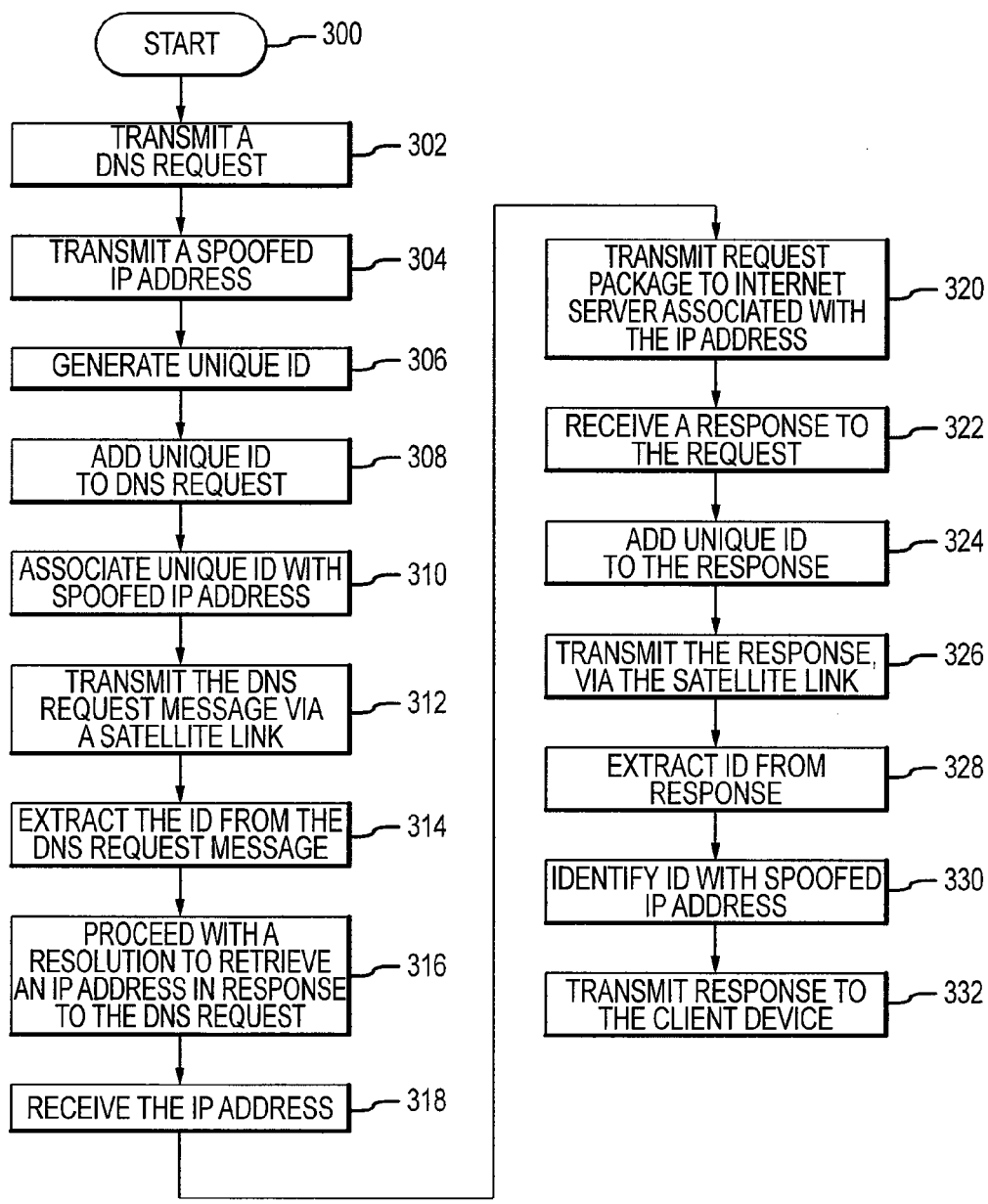
FIG. 6 is an exemplary flow chart of an operation of the PEP system of FIG. 5.

In this embodiment, a PEP system 250 may employ an IP spoofing domain name enhancement. FIG. 5 is an exemplary block diagram of the PEP system 250. FIG. 6 is an exemplary flow chart of a method or operation of the PEP system. In this operation, a client proxy and the hub proxy have established a plurality of persistent connections in order transmit data between one another on behalf of the client. For example, the client proxy may transmit messages, to the hub proxy, on a first persistent connection and receive messages, from the hub proxy, on a second persistent connection. Alternatively, the client proxy and the hub proxy may establish a non-persistent TCP/IP connection between one another.

Referring to FIG. 5, the PEP system 250 may include a client proxy 280 and a hub proxy 281, as disclosed above. A client 282 may communicate with the client proxy 281. The client proxy 281 may communicate with the hub proxy 281 via a satellite communications network 283. The hub proxy may communicate with any of the DNS servers and/or the Internet servers. The client, the client proxy, the satellite communications network, the DNS servers and the internet servers have been generally disclosed above. Generally, each of the above elements may operate as stated above; otherwise, each element may operate as stated below or in combination with at least one corresponding feature stated above.

Referring to FIGS. 5-6, the operation starts in operation 300. The client 282 transmits a DNS request 288 to the client proxy 280 over the established connection. The client proxy 280 receives the DNS request 288 and executes operation 304. In operation 304, the client proxy 280 transmits a spoofed IP address 289 to the client 282. The spoofed IP address may include an internally generated IP address that is unique and unavailable on the public IP network. In response to operation 304, the client 282 transmits a request for a webpage data 290 associated with the original DNS request.

In a similar manner as stated above, the client proxy 280 generates a unique ID in operation 306, and adds the unique ID to the DNS request in operation 308. In operation 310, the client proxy 280 may associate and store the unique ID, the spoofed IP address, and the DNS request in a data store. Using the unique ID, the client proxy 280 may later associate a response 296 to its original DNS request and its spoofed IP address. In operation 312, the client proxy may also transmit a request 291 for the original DNS request to the hub proxy.

The hub proxy 281 receives the request for the original DNS request, extracts the unique ID from the request in operation 314, and executes operation 316. In operation 316, the hub proxy 281 proceeds with a resolution by transmitting a DNS request 292 to the Internet server 288. The Internet server 288 may transmit an IP address message 293 associated with the DNS request to the hub proxy in operation 318. After receiving the IP address message 293, the hub proxy 281 may establish connection with another Internet server 20, and transmit the request package 294 associated with the IP address message in operation 320. In operation 322, the Internet server 20 may transmit a response message 295 to the request package and execute operation 324. In operation 324, the hub proxy may add the unique ID to the response, and, in operation 326, transmit the response packet 296 to the client proxy 280.

The client proxy 282 receives the response 296 with the unique ID and executes operation 328. In operation 328, the client proxy 282 extracts the unique ID from the response and executes operation 330. The client proxy 282 identifies the unique ID with the spoofed IP address previously sent to the client 282 in operation 330. In response to operation 330, the embodiment transmits the response to client based on the spoofed IP address in operation 332.

Figure 7:
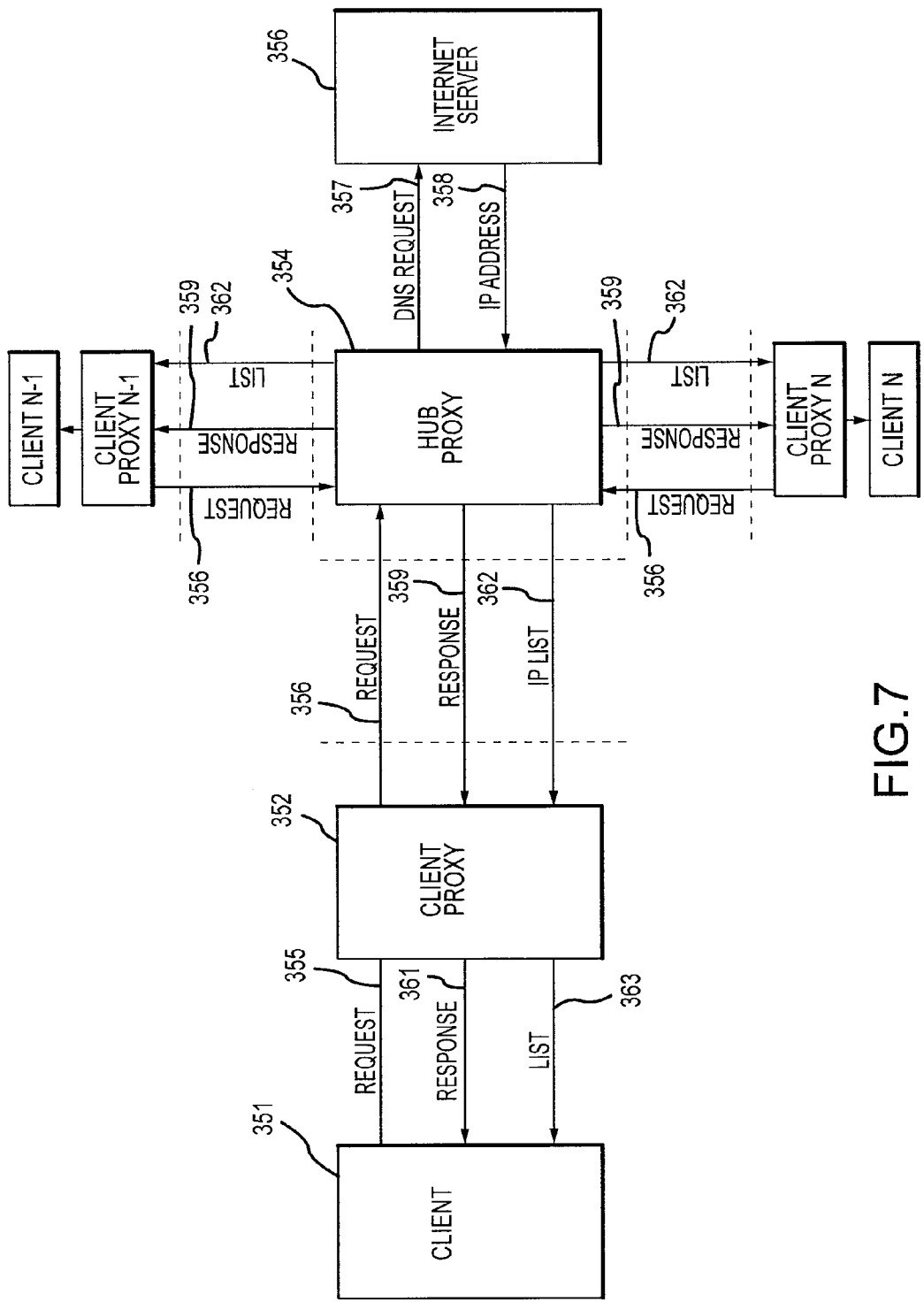
FIG. 7 is an exemplary block diagram of an additional embodiment of the PEP system according to the present disclosure.
Figure 8:
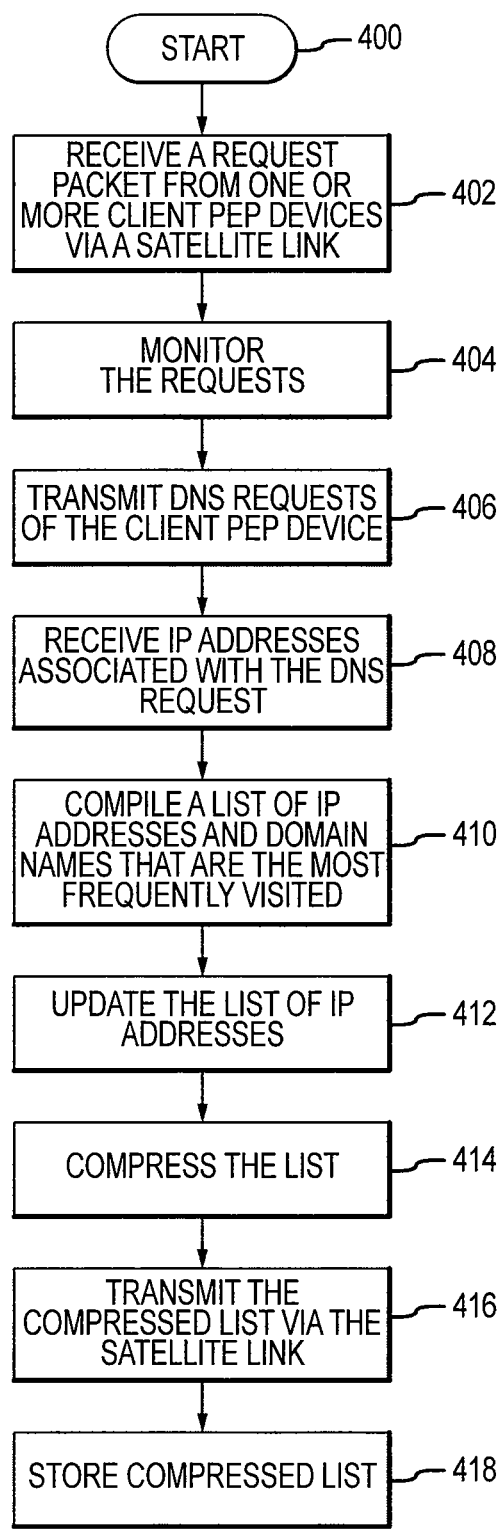
FIG. 8 is an exemplary flow chart illustrating an exemplary operation of the PEP system of FIG. 7.

DNS Enhancement with a List of Most Frequently Visited IP Addresses and/or Domain Names In another embodiment, a PEP system 350 may be employed using a cache domain name enhancement. FIG. 7 is an exemplary block diagram of the PEP system 350 of the present invention. FIG. 8 is a flow chart illustrating an exemplary method or operation of the PEP system. In this exemplary operation, a connection exists between a client proxy and a hub proxy to transmit data between each other and on behalf of the client. Additionally, the connection exists between the client and the client proxy, and a connection exists between the hub proxy and one or more Internet servers. These connections may be persistent or nonpersistent connections. Alternatively, data transmission between the client and the client proxy and/or the hub proxy and an Internet server may occur using an UDS protocol.

Referring to FIG. 7, the PEP system 350 may include one or more client proxies 352 and a hub proxy 354 in communication with the client proxies 352. Each client proxy 352 is in communication with a client 315, as discussed above. Additionally, the hub proxy 354 communicates with at least one of the Internet servers 20. Generally, each of the above elements may operate as stated above; otherwise, each element may operate as stated below or in combination with at least one corresponding feature stated above.

Referring to FIG. 8, the operation begins at operation 400. In operation 402, the hub proxy 354 may receive a request packet from one or more client proxies 352 and executes operation 404. In operation 404, the hub proxy 354 monitors web traffic of each client proxy 351 in communication with the hub proxy 354 in order to identify the most frequently requested IP addresses and/or domain names. In doing so, the hub proxy 354 requests IP addresses from the Internet server 20 for a plurality of domain names in operation 406 and in response, it receives corresponding IP address messages 358 in operation 408 and executes operation 410.

In operation 410, the hub proxy 354 compiles a list of domain names and/or IP addresses based on a statistical analysis of the most frequency requested IP addresses. The statistics may be compiled for a period of time, for example over a twenty-four hour period. After the period of time expires, the hub proxy 354 polls the DNS server to acquire updated IP addresses for each domain name listed in operation 412 and executes operation 414. In operation 414, the hub proxy 354 compresses the list. Compression is applied to the list in order to minimize an amount of traffic sent to client proxies and to reduce the amount of memory needed to store a statistically significant list of resolved IP addresses on the client proxy. In operation 416, the hub proxy 354 then transmits the compressed list 362, to the client proxy 352.

The client proxy 352 receives the aforementioned list of IP addresses and/or domain names and executes operation 418. The client proxy 352 transmits the list to the client 351, and in operation 418, the client 351 decompresses the list and stores the list in its cache along with other previously stored IP addresses. From this point on or until the IP addresses expire or are replaced by a new list received from the hub proxy, if the client determines that it needs an IP address, it may search the cache to determine whether it already has the IP address and operate as dictated by the web browser application. If it does not, the client may request the IP address of the domain name. Alternatively, the list may be stored in a data store associated with the client proxy, and the client proxy may transmit an IP address when a DNS requested is received from the client.

In-Line Data Prefetching

Figure 9:
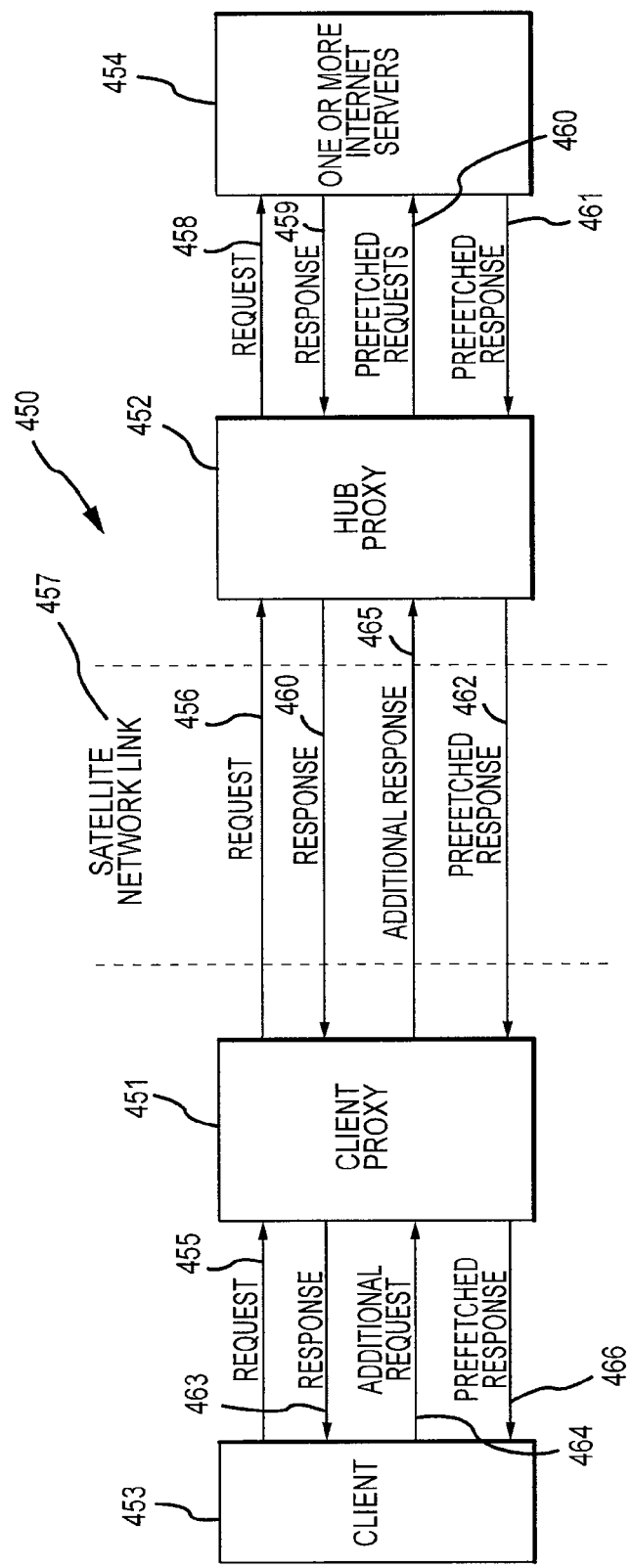
FIG. 9 is an exemplary block diagram of an embodiment of an exemplary PEP system according to the present disclosure.
Figure 10:
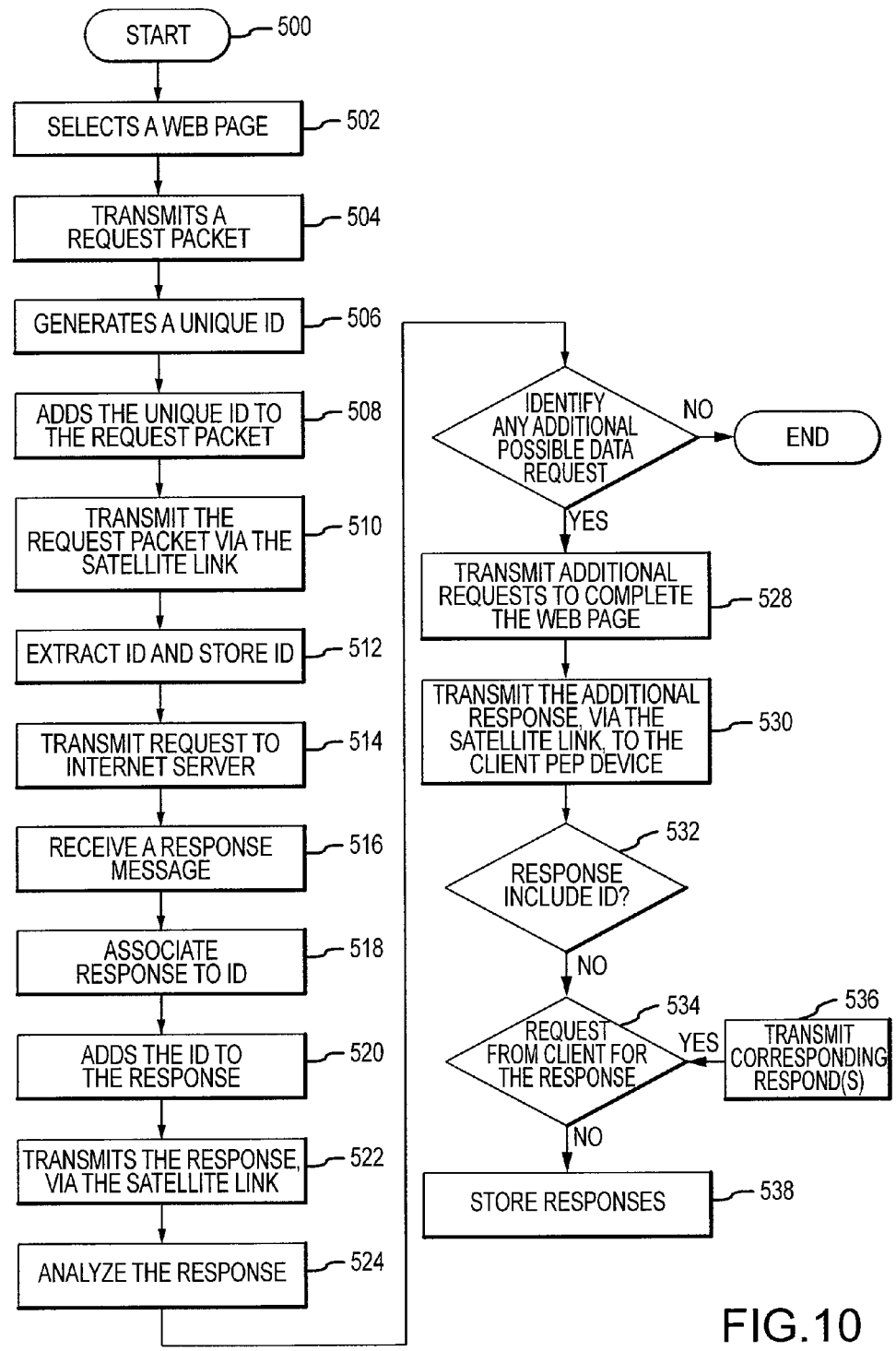
FIG. 10 an exemplary flow chart of an exemplary operation of the PEP system of FIG. 9.

In one embodiment, a PEP system 450 may implement a prefetching data method. FIG. 9 discloses an exemplary block diagram of an exemplary PEP system 450. FIG. 10 illustrates an exemplary operation or method of prefetching data as shown in FIG. 9. In this operation, a client proxy and a hub proxy have established a plurality of persistent connections in order transmit data between one another on behalf of the client. For example, the client proxy may transmit messages to the hub proxy across a first persistent connection and receive messages from the hub proxy on a second persistent connection. Alternatively, the client proxy and the hub proxy may establish a non-persistent TCP/IP connection between one another. In this embodiment, the client has received an IP address corresponding to a web page.

Referring to FIG. 9, a PEP system 450 may include a client proxy 451 and a hub proxy 452, as discussed above. A client 453 may communicate with the client proxy 451. The client proxy 451 may communicate with the hub proxy 452. The hub proxy 452 may communicate with at least one Internet servers 454. Generally, each of the above elements may operate as stated above; otherwise, each element may operate as stated below or in combination with at least one corresponding feature stated above.

Referring to FIG. 10, the embodiment starts operation 500. In operation 502, a user of the client 453 selects a web page for viewing using a browser application. The client 453 transmits a request packet 455 to the client proxy 451 in operation 504. For example, the request packet may include a request for data contents associated with the web page and the URL address of the web page. The client proxy 451 may receive the request packet and execute operation 506. In operation 506, the client proxy generates a unique ID and, in operation 508, adds the unique ID to the request packet. In operation 510, the client proxy transmits the request packet 456 to the hub proxy 452.

The hub proxy 452 receives the request packet and in response, extracts and stores the unique ID in operation 512. In operation 514, the hub proxy 452 transmits a request for the data contents 458 to the Internet server 454. In response, the Internet server 454 transmits a data response 459. In operation 516, the hub proxy 452 receives the response, and the embodiment executes operation 518. In operation 518, the hub proxy 452 associates the response with the unique ID and executes operation 520. In operation 520, the hub proxy adds the unique ID with the response and the embodiment transmits the response to the client proxy in operation 522.

The hub proxy 452 may also identify other possible requests that the client proxy 451 (on behalf of the client) may send based on the previously sent request and the response. In operation 524, the hub proxy analyzes the response and executes operation 526. For example, if the original request is for text contents of a web page, the hub proxy may receive a response for the text contents that may include holders or links identifying other data needed to be retrieved in order to complete the web page. The holders or link may identify any additional text files, graphic files, video files, and/or audio files. In operation 526, the hub proxy 452 may identify those indicators in the response that may indicate whether any additional data is needed to complete the web page requested. In other words, the hub proxy 452 may prefetch any additional data identified in the response to complete the web page. If the hub proxy identifies the additional data, operation 528 executes. In operation 528, the hub proxy prefetches those additional requests 460 to the Internet server 454. After receiving prefetched responses 461, the hub proxy may transmit the prefetched responses 462 to the client proxy as it receives them in operation 530. If the hub proxy determines that there is no additional data needed in operation 526, in operation 532, it may end the operation.

In operation 532, after receiving the prefetched responses, the client proxy 451 determines whether the received messages include an ID. If not, the embodiment executes operation 534. In operation 534, the client proxy 451 may determine whether it has received a request 464 for a particular response of the prefetched responses from the client. If so, the embodiment executes operation 536. In operation 536, the client proxy 451 transmits the response 466 corresponding to the request. If the client proxy determines that it has not received the request in operation 534, the embodiment executes operation 538. In operation 538, the client proxy stores the responses in a cache or related data storage. The response packets may be stored in the cache until either a predetermined period of time expires or the client requests a data from one of the response packets.

In the event the client 453 receives the response 463 corresponding to the original request 455 and transmits a second request 464 to retrieve additional responses needed to complete the web page, the client proxy 451 may receive and transmit the second request 465. After receiving the request, the hub proxy 452 may determine whether it has already sent the request. If so, the hub proxy may ignore the request. Alternatively, the hub proxy may transmit a message to the client proxy indicating that it has done so or a generic message asking the client proxy to stand by or wait for the additionally requested data. If the hub proxy determines that it has not transmitted the request from the Internet server, it may process to resolve the request and retrieve a response.

CONCLUSION

Although the present invention has been described with reference to preferred embodiments, persons skilled in the art may recognize that changes may be made in form and detail without departing from the spirit and scope of the invention.

What is claimed is:

1. A method of communicating between a client proxy and a hub proxy comprising: sending a request, from the client proxy to the hub proxy, for a plurality of unidirectional connections between the client proxy and the hub proxy, the plurality of unidirectional connections include a forward transmission link to transmit a first data signal from the client proxy to the hub proxy and a return transmission link to receive a second data signal sent to the client proxy from the hub proxy; acknowledging an establishment of the plurality of unidirectional connections; generating, by the client proxy, a unique identification for each data request; transmitting a data request signal from the client proxy to the hub proxy across the forward transmission link, wherein each data request signal transmitted by the client proxy includes the unique identification corresponding to the data request in a header of the data request; receiving a data transfer associated with the data request across the return transmission link wherein the client proxy is configured to associate the data transfer from the hub proxy across the return transmission link with the data request based upon the unique identification; removing the unique identification from the received data transfer and completing the data transfer associated with the data request; maintaining the forward and return transmission links after the data transfer is complete and until at least one of the client proxy and hub proxy is offline; receiving a data response based on the data request; receiving a prefetched response based on the data response; and storing the prefetched response, wherein the unique identification identifies the data request and is unique to each data request.

2. The method of claim 1 wherein the operation of establishing comprises establishing the forward and return transmission links across a satellite communications network.

3. The method of claim 1, wherein the operation of transmitting the data request signal comprises:
receiving a first data request associated with a webpage from a client;
transmitting the first request to the hub proxy across the forward transmission link; and
receiving a response message from the hub proxy across the return transmission link.

4. The method of claim 1, further comprising transmitting the prefetched response, to a client, when a second request associated with data of the at least one prefetched response is received.

5. The method of claim 1, further comprising receiving a complied list of most frequently requested domain names via the return transmission link.

6. The method of claim 1, wherein the data request includes a request for an Internet protocol address associated with the webpage.

7. The method of claim 6, further comprising transmitting an internally generated spoof Internet protocol address in response to receiving a first data signal from a client.

8. A method of operating a hub proxy and a client proxy, comprising:
receiving, by the hub proxy, a data request from the client proxy, the client proxy sending the data request on behalf of a first user, the data request including a unique identification generated by the client proxy in a header of the data request, wherein the client proxy is configured to track the data request based upon the unique identification;
transmitting, by the hub proxy, the data request to an internet server;
receiving, by the hub proxy, a data response based on the data request;
transmitting, by the hub proxy, the data response along with the unique identifier to the client proxy;
transmitting, by the client proxy, the data response without the unique identifier to a client;
determining, by the hub proxy, whether the data response includes an indicator that identifies additional data needed to complete the data request, wherein the additional data has not been accessed; and
when the data response includes the indicator, prefetching data, by the hub proxy, associated with the indicator prior to receiving a specific request for the additional data,
wherein the unique identification identifies the data request and is unique to each data request.

9. The method of claim 8, wherein the operation of receiving the data request comprises receiving the data request associated with a webpage.

10. The method of claim 9, further comprising:
receiving a plurality of domain name requests associated with a plurality of webpages from a plurality of client proxies; and
generating a complied list of most frequently requested Internet protocol addresses based on the plurality of domain name requests.

11. The method of claim 8, further comprising transmitting prefetched additional data to the user.

12. The method of claim 11, further comprising receiving the data request over a satellite communication network.

13. The method of claim 12 further comprising receiving a second data request from a second user.

14. The method of claim 13, further comprising generating a complied list of most frequently requested domain names or Internet protocol addresses by the first user and the second user.

15. The method of claim 14, further comprising transmitting the complied list to the first user and the second user.

16. The method of claim 8, further comprising:
receiving a second data request; and
ignoring a second data request from the client proxy if the second data request is associated with prefetched data.

17. The method of claim 8, wherein the operation of receiving the data request comprises:
extracting the unique identification from the data request.

18. The method of claim 17, wherein the unique identification comprises a uniform resource locator (URL) address of the webpage, port number, and source IP address of the client proxy.

19. A method of operation a client proxy, comprising:
receiving a data message from a hub proxy, the data message associated with contents of a webpage requested by a user;
determining whether the data message includes a unique identification in a header of the data message associated with a previously transmitted data request from the user;
when the data message is associated with a previously transmitted data request, transmitting the data message to the user;
when the data message is prefetched data, determining if the user has requested the prefetched data; and
when the user has not requested the prefetched data, storing the prefetched data in a data store until a data request is received from the user,
wherein the unique identification is generated by the client proxy, identifies the data message and is unique to each data message.

20. The method of claim 19 further comprising generating the unique identification associated with the data request.

21. The method of claim 20 further comprising determining whether the prefetched data is associated with the data request based on at least one of a uniform resource locator (URL) address of the webpage and an Internet Protocol address.

\* \* \* \* \*